United States Patent [19]

Lautzenhiser et al.

[11] Patent Number: 5,456,109
[45] Date of Patent: * Oct. 10, 1995

[54] THICK FILM ROTATIONAL ACCELEROMETER HAVING TWO STRUCTURALLY INTEGRATED LINEAR ACCELERATION SENSORS

[75] Inventors: Frans P. Lautzenhiser, Noblesville; Bradley R. Knigga, Kokomo; Gary M. Gillund, Kokomo, all of Ind.

[73] Assignee: Delco Electronics Corporation, Kokomo, Ind.

[*] Notice: The portion of the term of this patent subsequent to Jan. 11, 2011 has been disclaimed.

[21] Appl. No.: 38,422

[22] Filed: Mar. 29, 1993

[51] Int. Cl.⁶ .................................................. G01P 15/08
[52] U.S. Cl. ........................................ 73/514.03; 364/566
[58] Field of Search .................................. 73/517 A, 510; 364/566; 338/2, 5

[56] References Cited

U.S. PATENT DOCUMENTS

| | | | |
|---|---|---|---|
| 4,095,547 | 6/1978 | Benington | 73/517 A X |
| 4,750,364 | 6/1988 | Kawamura et al. | 73/510 |
| 4,990,986 | 2/1991 | Murakami et al. | 357/26 |
| 4,996,878 | 3/1991 | Kübler | 73/510 |
| 5,009,106 | 4/1991 | Kubler et al. | 73/651 |
| 5,247,466 | 9/1993 | Shimada et al. | 73/517 A X |
| 5,277,064 | 1/1994 | Knigga et al. | 73/517 R |

FOREIGN PATENT DOCUMENTS

| | | |
|---|---|---|
| 0301816 | 7/1988 | European Pat. Off. . |
| WO89/11104 | 11/1989 | European Pat. Off. . |
| WO92/15018 | 9/1992 | European Pat. Off. . |
| 5-72223 | 3/1993 | Japan ................ 73/517 A |

OTHER PUBLICATIONS

Translation of Japanese Kokai Patent Application JP5–72223 by the Ralph McElroy Translation Co.

*Primary Examiner*—Richard Chilcot
*Assistant Examiner*—Joseph L. Felber
*Attorney, Agent, or Firm*—Vincent A. Cichosz; Mark A. Navarre

[57] ABSTRACT

A rotational accelerometer has a pair of coplanar, operationally independent linear acceleration sensors. Coplanarity is provided by a unitary substrate which forms the base structure of the operationally independent linear acceleration sensors.

1 Claim, 5 Drawing Sheets

THICK FILM ROTATIONAL ACCELEROMETER HAVING TWO STRUCTURALLY INTEGRATED LINEAR ACCELERATION SENSORS

BACKGROUND OF THE INVENTION

The present invention relates generally to an inertial instrument. More particularly, the invention pertains to accelerometers used as sensors for measuring linear accelerations and rotation rates and accelerations of a moving body.

Vibratory gyroscopes taking many base forms, such as disks, tuning forks, cylinders and hemispherical shells base their sensing capabilities upon precession of a standing wave in a vibratory member. Such devices typically find use in commercial avionics and navigational systems and provide a very high degree of sensitivity and accuracy required in those fields. Other types of rotation sensors rely on more conventional motor drive gyroscopes to indicate rotation. Shortfalls of either general types of rotation sensors, that is those relying on vibratory members or motor driven gyroscopes, include size, cost, requirement for power input to maintain a detectable quantity and in the case of motor driven gyroscopes moving parts such as gimbals, ball bearings, slip rings and other mechanical features.

Many automotive systems would benefit from a low cost rotational quantity sensor. Non-exhaustive exemplary system usages include vehicle navigational systems, chassis control systems, such as active suspensions and active rear steering, and anti-slip regulation systems such as antilock braking and limited slip acceleration.

SUMMARY OF THE INVENTION

The preceding and certain other problems of the prior art are addressed and solved by the present invention which generally provides for a rotational accelerometer which comprises a pair of structurally integrated, operationally independent linear accelerometers both responsive to accelerations normal to a common plane therebetween. Linear accelerometers are separated by a known distance and provide independent measures of acceleration which are used to derive rotational acceleration, rotational rate, and rotational direction from the linear acceleration signals.

A further aspect the invention extends itself to well known types linear acceleration sensors such as those having a proof mass disposed at an unsupported end of a cantilevered flexure member. Further, such linear acceleration sensors may be produced by well known thick film processes.

In a preferred form of the present invention a thick film rotational accelerometer is comprised of an alumina fulcrum section having a pair of integral substantially coplanar and co-symmetrical lever sections extending therefrom. At the interface of the alumina fulcrum section and each lever section is a respective fulcrum end. The opposite end of each lever section provides support for a respective proof mass, each substantially equivalent and equidistant from the fulcrum section. Thick film linear accelerometers are relatively insensitive to motion within the plane defined by the lever structure. Substantially all sensor output will be generated by mass displacement in a direction normal to the plane.

In another aspect of the invention, output signals from the pair of structurally integrated linear accelerometers are used to produce a signal which is a measure of angular acceleration substantially proportional to the distance therebetween. This signal may then be integrated to produce a second signal which is a measure of the angular rate of rotation. A further integration may be performed to yield yet a third signal which is a measure of rotational direction.

In another aspect of the invention, a method is provided in which a pair of linear acceleration signals produced along parallel axes and out of a common plane are used to measure rotational acceleration, rotational rate and rotational direction.

DETAILED DESCRIPTION OF THE PREFERRED EMBODIMENTS

Figure 1:
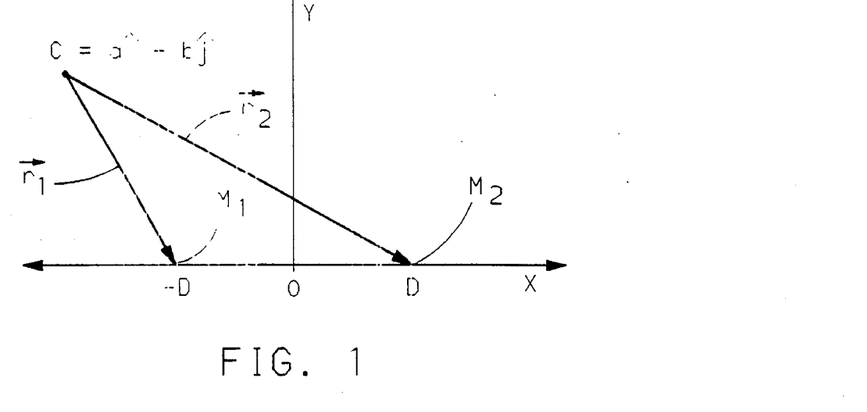
FIG. 1 illustrates a cartesian coordinate system which aids in geometrically defining response characteristics of the present invention according to convention.

Referring first to FIG. 1, a cartesian coordinate system is shown to aid in the explanation and derivation of accelerations of and interrelationships therebetween a pair of masses arranged substantially coplanar with each other. Two dimensions of a three dimension coordinate system are shown by two axes (X-axis and Y-axis) in the plane of the page and a third axis into the page (not labeled for clarity of illustration). The axis into the page (not shown) is conventionally referenced as the Z-axis. A plane defined by the X-axis and the Z-axis defines a common plane for mass elements labeled $M_1$ and $M_2$. Origin point labeled O is the center point between mass element $M_1$ and $M_2$ and is likewise coplanar therewith in the plane previously described as that defined by the X-axis and the Z-axis. Mass elements $M_1$ and $M_2$ are both equidistant from origin O along the X-axis, each an absolute distance of D from origin O. Conventional cartesian vector designations are utilized here wherein $\hat{i}$ indicates a unit vector along the X-axis and $\hat{j}$ indicates a unit vector along the Y-axis. For a rotation with rotational rate θ about arbitrary point $C=a\hat{i}+b\hat{j}$, there are accelerations of mass elements $M_1$ and $M_2$ located at respective positions labeled on the coordinate systems as −D and D. Vectors $\vec{r}_1$ and $\vec{r}_2$ point toward mass elements M1 and M2 from the center of rotation C. Vector formulas for the two illustrated vectors are as follows:

$$\vec{r}_1 = (a+D)\hat{i} + b\hat{j} \quad (1)$$

$$\vec{r}_2 = (a-D)\hat{i} + b\hat{j} \quad (2)$$

Following a general formula for acceleration due to a rotation, $$\vec{A}_\theta = \dot{\theta}^2 \vec{r} \qquad (3)$$

the individual accelerations of mass elements $M_1$ and $M_2$ are expressed as:

$$\vec{A}_{\theta 1} = -[(a+D)\hat{i} + b\hat{j}]\dot{\theta}^2 \qquad (4)$$

$$\vec{A}_{\theta 2} = -[(a-D)\hat{i} + b\hat{j}]\dot{\theta}^2 \qquad (5)$$

The acceleration differential is $$\vec{A}_{\theta 2} - \vec{A}_{\theta 1} = \Delta\vec{A}_\theta = 2D\dot{\theta}^2 \hat{i} \qquad (6)$$

which shows that for a rotation about arbitrary point C, a net acceleration differential $\Delta\vec{A}_\theta$ between mass elements $M_1$ and $M_2$ exists with components exclusively in the X-direction which is proportional to the square of the rotational rate.

For rotational acceleration $\ddot{\theta}$ about arbitrary point C, the corresponding accelerations of mass elements $M_1$ and $M_2$ follow the general formula as follows:

$$\vec{A}_\theta = |\vec{r}|\ddot{\theta}\hat{d} \qquad (7)$$

where $\hat{d}$ by definition is a unit vector having a direction perpendicular to $\vec{r}$. Individual unit vectors $\hat{d}$ are as follows:

$$\hat{d}_1 = (b\hat{i} - (a+D)\hat{j})/|\vec{r}_1| \qquad (8)$$

$$\hat{d}_2 = (b\hat{i} - (a-D)\hat{j})/|\vec{r}_2| \qquad (9)$$

The individual accelerations of mass elements $M_1$ and $M_2$ due to rotational acceleration reduce to $$\vec{A}_{\theta 1} = (b\hat{i} - (a+D)\hat{j})\ddot{\theta} \qquad (10)$$

$$\vec{A}_{\theta 2} = (b\hat{i} - (a+D)\hat{j})\ddot{\theta} \qquad (11)$$

and the acceleration differential is $$\vec{A}_{\theta 2} - \vec{A}_{\theta 1} = \Delta\vec{A}_\theta = 2D\ddot{\theta}\hat{j} \qquad (12)$$

which shows that for a rotational acceleration about arbitrary point C, a net acceleration differential $\Delta\vec{A}_\theta$ between mass elements $M_1$ and $M_2$ exists with components exclusively in the Y-direction which is proportional to the rotational acceleration.

It follows from the above derivations that a device sensitive exclusively to Y-direction linear accelerations upon individual mass elements $M_1$ and $M_2$ may be adapted to reject influences of rotational rate $\dot{\theta}$ yet be responsive to rotational accelerations $\ddot{\theta}$. This is true, however, only to the extent that mass elements $M_1$ and $M_2$ are coplanar within X-Z. Fundamental deviations from Y-direction device sensitivity and coplanarity requirements will result in corresponding response errors which will be illustrated with reference to deviations from a preferred embodiment of the present invention at a later point in this disclosure.

Certain advantages are inherent in a device which is responsive to rotational accelerations. With reference to formula (6) above, a device sensitive to rotational rate $\dot{\theta}$ about a point C—that is a device sensitive to linear accelerations of individual mass elements $M_1$ and $M_2$ exclusively in the X-direction—may be adapted to produce an output signal proportional to the square of the rotational rate $\dot{\theta}^2$. Any signal from a clockwise rotation would be indistinguishable from a signal from a counterclockwise rotation. In contrast, with reference to formula (12) above, a device sensitive to rotational acceleration $\ddot{\theta}$ about a point C—that is a device sensitive to linear accelerations of individual mass elements $M_1$ and $M_2$ exclusively in the Y-direction—may be adapted to produce an output signal proportional to rotational acceleration $\ddot{\theta}$ and not its square. Therefore, directional information in the form of algebraic signs would be available therefrom.

Figure 2A:
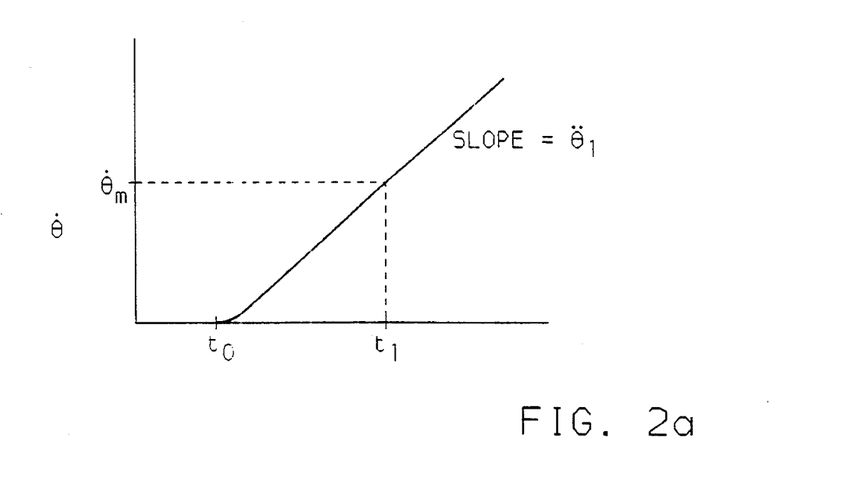
FIGS. 2a and 2b illustrate advantageous response characteristics according to the present invention.
Figure 2B:
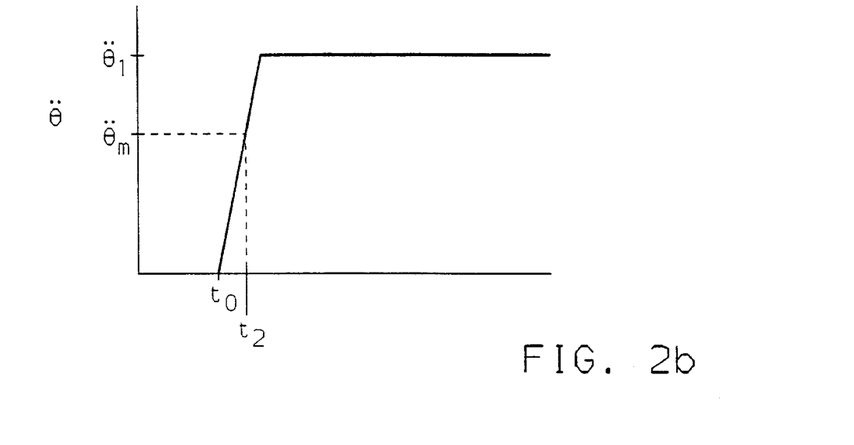

Another advantage is most effectively explained with reference to FIGS. 2a and 2b, wherein FIG. 2a illustrates on the horizontal axis time and the vertical axis rotation rate $\dot{\theta}$. $\dot{\theta}_m$ indicates an arbitrary sensing threshold, a minimum value for which rotation will produce a detectable signal. The plotted line indicates a linearly increasing rotational rate over time. A time $\Delta t_1$ equal to $(t_1 - t_0)$ elapses before a change in motion is detected. Referring to FIG. 2b with the same time scale on the horizontal axis and with the vertical axis now representing rotational acceleration $\ddot{\theta}$, a value $\ddot{\theta}_m$ equal to the minimum threshold value for which rotational acceleration will produce a detectable signal is shown. The plotted curve represents the rotational acceleration $\ddot{\theta}$ over time which is equal to $d\dot{\theta}/dt$ from the curve in FIG. 2a. The rising portion of the curve is shown expanded for clarity. Here, an elapsed time $\Delta t_2$ equal to $(t_2 - t_0)$ before rotational acceleration is detected is a fraction of $\Delta t_1$ as shown in FIG. 2a. A rotational accelerometer will generate a significant signal detectable in a significantly shorter time assuming the rotational acceleration is greater than the minimum threshold rotation acceleration $\ddot{\theta}_m$. For example, consider the case of a rotational accelerometer having a threshold sensitivity of $1°/s^2$, and a rotational rate sensor having a threshold sensitivity of $1°/s$, both of which are subjected to a rotational acceleration of $2°/s^2$. In this case, the rotational accelerometer sensor will generate a significant signal in a time limited only by the bandwidth of the instrument. For a 20 Hz bandwidth, the response time is approximately 0.05 seconds. In contrast, the rotational rate sensor will experience its threshold rotational rate of $1°/s$ in about 0.5 seconds. The times to significant signal in this case varies by about a factor of ten.

Figure 3:
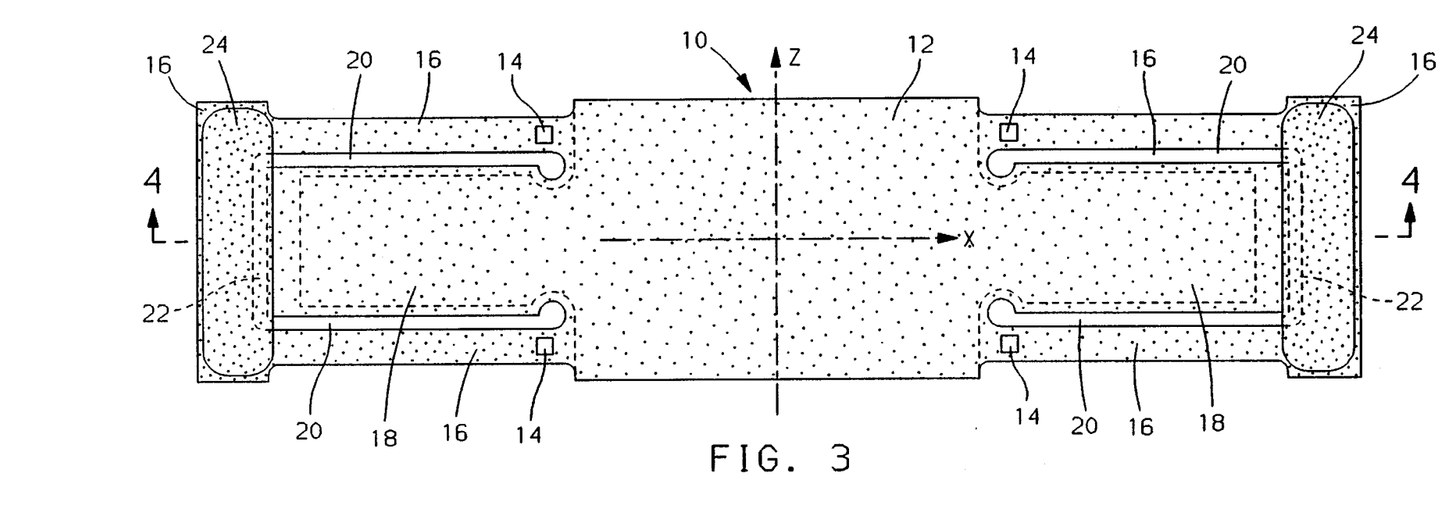
FIG. 3 illustrates a top view of a preferred form of the present invention.
Figure 4:
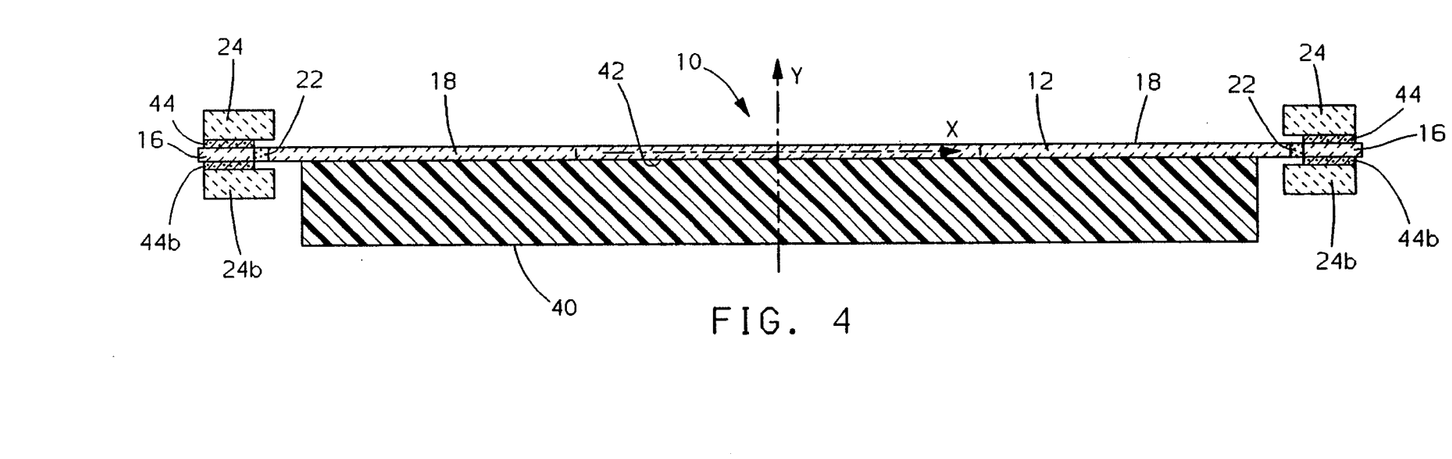
FIG. 4 illustrates a cross-sectional view of a preferred form of the present invention taken along line 4—4 of FIG. 3.

Referring now to FIGS. 3 and 4, a top and cross-sectional view respectively are shown of a preferred embodiment of the invention. FIG. 4 further has imposed upon it X and Y axes corresponding to the description heretofore laid out wherein sensor sensitivity is along the Y-axis. FIG. 3 shows a similar coordinate system having the X-axis and Z-axis in this case illustrating the plane X-Z in which a pair of structurally integrated linear acceleration sensors are disposed.

Shown in FIG. 3 is a first surface (for convenience it will be referred to as the top surface) of a thick film rotational accelerometer 10 in accordance with a preferred embodiment of this invention. The opposite surface (or bottom surface) of rotational accelerometer 10 is not shown but is essentially identical to the top surface shown in FIG. 3. The preferred rotational accelerometer 10 is suitable for use in on-board automotive safety control and navigational systems.

A preferred thick film rotational accelerometer 10 is formed from an alumina substrate. Rotational accelerometer 10 has a fulcrum section 12, U-shaped lever sections 16, and rigidly affixed support members 18. As discussed more fully later, rotational accelerometer 10 is secured to an appropriate backplate so as to rigidly support fulcrum section 12 and support members 18 while allowing deflection of U-shaped lever sections 16. As shown, support members 18 are integral with fulcrum section 12. Fulcrum section 12 and support members 18 could be of an alternative shape, as compared to their rectangular shapes shown, however for efficient economy of design, the rectangular shapes are preferred. For similar design reasons, the lever sections are substantially collinear but may alternatively have independent axes so long as hey remain substantially coplanar.

U-shaped lever sections 16 are also formed to be integral with fulcrum section 12. As shown, the two side beams of each U-shaped lever section 16 are integral with fulcrum section 12. In addition, as shown, the side beams are thinned along their length which permits greater deflection during acceleration, thereby enhancing the output signal of rotational accelerometer 10. This is not necessary, although it is preferred.

The U-shaped lever sections 16 surrounds support member 18 so that a gap (represented by reference numeral 20 along the side beams of U-shaped lever sections 16 and by reference numeral 22 along the unsupported ends of the U-shaped lever sections 16) exists substantially everywhere therebetween the U-shaped lever sections 16 and corresponding support member 18. This gap 20, 22 which delineates the rigidly affixed fulcrum section 12 and support members 18 from the lever sections 16 is formed using conventional techniques, such as by ceramic green-punch techniques.

Mass elements 24, 24b are provided on both sides of the unsupported end of the U-shaped lever sections 16. (Reference to mass element 24 will include both mass elements 24 and 24b, unless noted otherwise.) Mass element 24 is preferably formed by attaching a sufficiently thick piece of die cast zinc on each side of U-shaped lever sections 16. (Alternatively, mass elements 24 could be a single piece which is essentially pocket-shaped, wherein the unsupported ends of U-shaped lever sections 16 fit within the pocket region, so that the mass element 24 essentially wraps around the unsupported end of U-shaped lever sections 16.) The thickness of each of mass elements 24 may vary, but must be sufficient to accentuate the deflection of U-shaped lever sections 16 in a direction perpendicular to the plane X-Z of support members 18 during acceleration. As an example, for a rotational accelerometer 10 in accordance with this invention, the thickness of the alumina substrate from which fulcrum section 12, lever sections 16 and support members 18 are formed is about 0.025 inches, and the thickness of the mass 24, 24b provided on each surface of the substrate is about 0.2 inches, for a total mass 24, 24b thickness of about 0.425 inches.

The U-shape of the lever sections 16 is preferred since it advantageously allows for the attachment of a relatively sizeable mass 24 at its unsupported end, while the two side beams of each U-shaped lever section 16 essentially allow deflection only in the direction perpendicular to the plane X-Z.

Support members 18 are disposed substantially intermediate between fulcrum section 12 and respective mass element 24. Although support members 18 are not absolutely necessary, they are preferred since they help to alleviate the tensional stresses encountered by fulcrum section 12 during deflection of U-shaped lever sections 16, and because they are sufficiently large to incorporate the required electronic circuitry.

Deflection of U-shaped lever sections 16 is maximum at their unsupported ends where mass element 24 is disposed. Correspondingly, the strain encountered by lever sections 16 during deflection is maximum at the supported ends of the beam portions of each U-shaped lever section 16 adjacent fulcrum section 12.

Accordingly, means for detecting the strain resulting from the deflection of the lever sections 16, which corresponds to accelerations in the direction perpendicular to the plane of support member 18, are provided on U-shaped lever sections 16 adjacent fulcrum section 12. Preferably the detection means consists of eight piezoresistors represented by reference numeral 14. Four piezoresistors 14 are preferably provided on the top surface, two on each of U-shaped lever sections 16 at the supported end of each beam thereof so as to be oppositely disposed around a respective one of support members 18. Similarly, four piezoresistors (not shown) are located on the bottom surface in analogous positions. Piezoresistors 14 are preferably formed by deposition onto the alumina substrate using conventional thick film deposition techniques, such as silk screening, although other techniques could also be used.

As each U-shaped lever section 16 deflects downwardly due to an acceleration in the direction perpendicular to the plane X-Z, the resistance of the top two corresponding piezoresistors 14 increases under tension while that of the bottom two corresponding piezoresistors (not shown) decreases under compression. Analogously, as each U-shaped lever section 16 deflects upwardly due to an acceleration in the opposite direction, the resistance of the top two corresponding piezoresistors 14 decreases under compression while that of the bottom two corresponding piezoresistors (not shown) increases under tension. The eight piezoresistors 14 form two conventional Wheatstone bridges. The analog output voltages from the Wheatstone bridges are conditioned and amplified to provide the output signals. The desired offset and sensitivity required for operation of rotational accelerometer 10 may be modified by conventional laser trimming operations of any or all of the piezoresistors 14 if desired.

The electrical circuitry required for signal conditioning and amplifying is preferably provided by an appropriate integrated circuit chip that has been attached using conventional methods such as flip-chip technology, or alternatively, formed by deposition of the circuitry pattern onto support member 18 or fulcrum section 12 using conventional thick film deposition techniques, such as silk screening. This is a particularly advantageous feature of this invention in that all of the mechanical and electrical components for rotational accelerometer 10 are essentially self-contained on a single alumina substrate.

FIG. 4 shows a cross-sectional view of a mounted rotational accelerometer 10 taken along line 4—4 of FIG. 3 which is primarily through fulcrum section 12 and support members 18. As stated previously, fulcrum section 12 is rigidly attached at region 42 to a backplate 40 which may be integral with a housing. Fulcrum section 12 is secured to backplate 40 by a suitable bonding agent which is applied evenly onto region 42 of backplate 40 for uniform adhesion, and is preferably a silicone adhesive material such as Dow Corning QX-6265. Such a silicone adhesive is more resilient than an epoxy or other rigid mounting material, such that adhesive-transmitted mechanical stresses are greatly reduced. In addition, this layer of resilient adhesive also prevents transfer of any stresses which may arise during the mounting of rotational accelerometer 10.

In addition, mass elements 24, 24b are securely attached to the unsupported ends of U-shaped lever sections 16 by means of a suitable adhesive 44, 44b deposited between U-shaped lever sections 16 and mass elements 24, 24b. Preferably, this adhesive is the above-named Dow Corning QX-6265, although other adhesives and epoxies could also be used. The unsupported ends of U-shaped lever sections 16 having mass elements 24, 24b are free to deflect in response to accelerations in the direction perpendicular to the plane X-Z. It is noted that the relative size of mass elements 24, 24b is exaggerated for purposes of the description of this invention. Further details of typical mounting may be referenced in and readily adapted from U.S. Pat. No. 5,277,064, issued Jan. 11, 1994, and assigned to the assignee of the present invention; specifically, pages 11 through 16 inclusive are herein incorporated by reference.

Rotational accelerometer 10 further contains integrally formed means for preventing excessive deflection of mass elements 24, 24b past a predetermined distance. Mass elements 24, 24b are preferably provided on both sides of the unsupported U-shaped lever sections 16, so that mass elements 24, 24b slightly overhang the rigidly affixed support members 18. As noted, the adhesive layer used to affix fulcrum section 12 to backplate 40 is provided continuously under support members 18 also. Gaps 22 between U-shaped lever sections 16 and support members 18 are apparent in FIGS. 3 and 4. In addition, the intentional slight overhang of mass elements 24, 24b compared to support members 18, is sufficient to allow deflection of U-shaped lever sections 16, but upon excessive deflection in either direction mass elements 24, 24b contact support members 18 so as to prevent excessive deflection of U-shaped lever sections 16.

The structure of the preferred rotational accelerometer 10 incorporating this inherent mechanical stopping feature is particularly advantageous in that the integrity and overall life of the rotational accelerometer is greatly enhanced by alleviating excessive deflection of U-shaped lever sections 16. Yet, no additional components are required to provide the stopping means, since the stopping means are formed by the shape of mass elements 24, 24b.

After rotational accelerometer 10 is packaged as described above, it is further packaged within a sealed canister, or other suitable container, for use in, for example, an automotive control system. It is preferred that rotational accelerometer 10 be sealed within the canister so as to prevent dirt, oil, dust and other contamination from contacting rotational accelerometer 10.

It is to be noted that the preferred rotational accelerometer 10 tends to oscillate at its natural frequency, however so as to achieve a frequency having a maximum bandwidth, such as greater than about 500 Hertz, rotational accelerometer 10 is preferably damped. Damping the accelerometer is advantageous in that it not only increases the frequency bandwidth, but also because it reduces the amplitude of the vibrations at resonance, thereby reducing the risk of component breakage, particularly resulting from shock. Details of packaging and damping are beyond the scope of the present invention but exemplary details may be referenced in pending U.S. patent application Ser. No. 07/864,708, now U.S. Pat. No. 5,277,064.

The single unitary alumina substrate provides the highest degree of cost effective coplanarity between mass elements thus ensuring reliable rotational acceleration sensing. As a result, rotational accelerometer 10 responds exclusively to the vehicle dynamics associated with accelerations out of the plane X-Z.

A significant advantage of this invention is that rotational accelerometer 10 is formed using conventional thick film processing techniques, so as to readily produce a rotational accelerometer 10 characterized by reliability, accuracy, ruggedness and low cost. The thick film circuitry is beneficially characterized by a low thermal coefficient of electrical resistivity, while the mechanical properties of the alumina substrate are fully characterized, thereby providing a proven sensor unit. These characteristics make rotational accelerometer 10 suitable for use in an on-board automotive system, as well as other applications.

In addition, another advantage is that a single alumina substrate is employed for formation of rotational accelerometer 10 containing U-shaped lever sections 16 and support members 18 which has the detection means 14 and the signal conditioning circuitry. These components are all integrally formed on the alumina substrate. Further, the mechanical stopping means which prevent excessive deflection of the U-shaped lever sections 16 are also integrally formed in the preferred rotational accelerometer 10, so as to minimize the number of components within the sensor. The above structural characteristics of the preferred rotational accelerometer 10 minimize the ability of extraneous vibrations and mechanical stresses to develop and become amplified in the vicinity of rotational accelerometer 10.

Figure 5A:
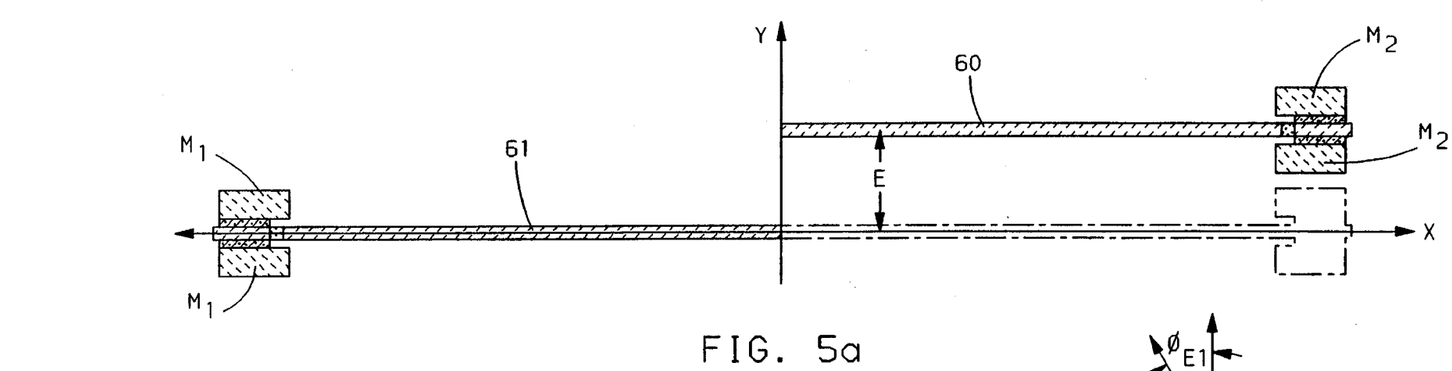
FIGS. 5a through 5c are illustrative of some fundamental deviations in sensor geometry which produce error signals overcome by the present invention.
Figure 5B:
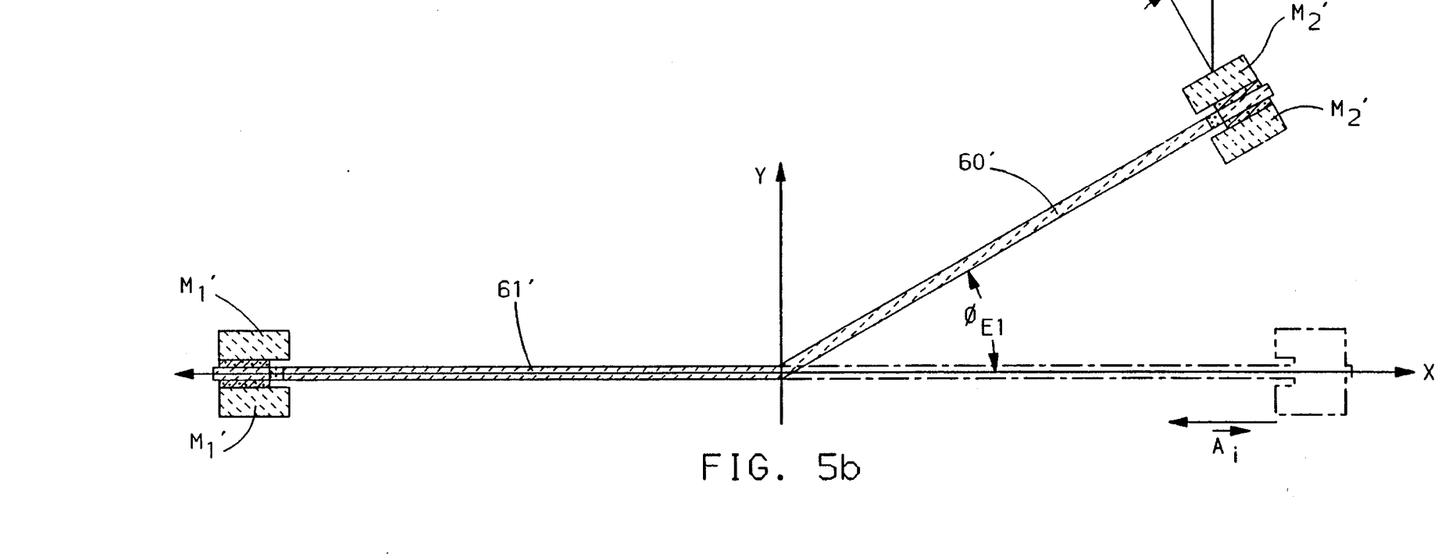
Figure 5C:
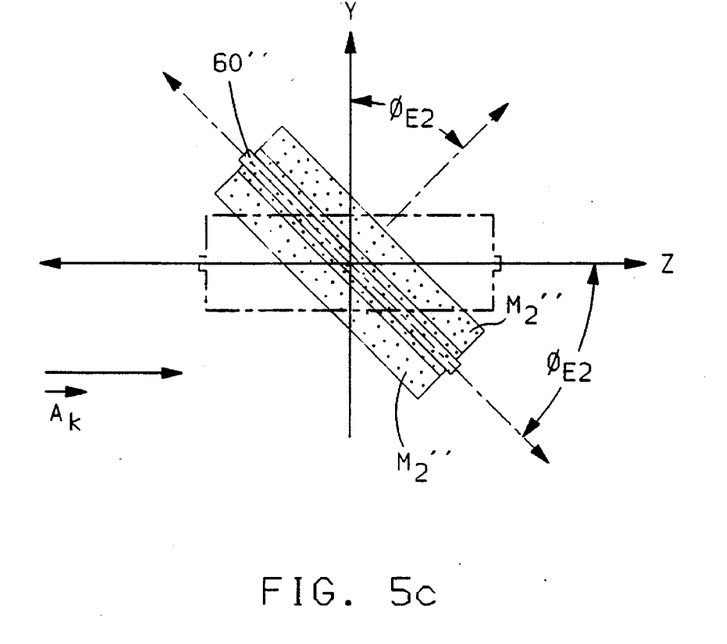

Shown in FIGS. 5a through 5c are individually isolated deviations from planarity and Y-direction sensitivity which cause fundamental response errors, which deviations are largely overcome by the present inventive rotational accelerometer. Only those portions of a sensor assembly necessary to demonstrate the error causing deviations are illustrated for clarity. Dashed line portions of the figures represent non-deviant sensor geometry and is the reference from which deviation is measured.

A first fundamental deviation in FIG. 5a shows non-planarity of two operationally independent linear acceleration sensors. Each sensor response axis is parallel to the other and properly normal to the plane X-Z. Lever section 61 and mass $M_1$ are in plane X-Z whereas lever section 60 and mass $M_2$ are in a plane parallel with X-Z separated a distance E therefrom along the Y-axis. Equations (2) through (6) carry the additional term E through to arrive at an acceleration differential due to rotational rate as follows:

$$\vec{A}_{o2} - \vec{A}_{\theta I} = \Delta \vec{A}_\theta = 2D\theta^2 \vec{i} + E\theta^2 \vec{j} \tag{13}$$

As a result, a rotational accelerometer sensitive to Y-direction acceleration differential components exclusively will no longer entirely reject acceleration influences from rotational rates since rotational rates would produce an acceleration differential component in the Y-direction ($E\theta^2\vec{j}$).

A second fundamental deviation in FIG. 5b also shows non-planarity of two operationally independent linear acceleration sensors. Each sensor response axis in this case however is not parallel with the other. The sensor lever sections are at an angle with each other and are not coplanar. The operationally independent sensor corresponding to mass element $M_1'$ has a response axis normal to the plane X-Z whereas the functionally independent sensor corresponding to mass element $M_2'$ has a response axis at some angle $\phi_{E1}$ from normal to plane X-Z. An acceleration $\vec{A}_i$ in the X-direction will not displace mass element $M_1'$ but will displace mass element $M_2'$ along its response axis in proportion to the Sine of $\phi_{E1}$. As a result, the rotational accelerometer is not exclusively sensitive to Y-direction acceleration differential components since one of the two operationally independent sensors responds to acceleration in the X-direction. An error signal proportional to the Sine of the offset angle $\phi_{E1}$ and X-direction acceleration $\vec{A}_i$ will therefore be present.

A third fundamental deviation in FIG. 5c also shows non-planarity of two operationally independent linear acceleration sensors. An end view along the X-axis of one of the two sensors is shown. Each sensor response axis in this case is also not parallel to the other. The two sensors are twisted or bowed with respect to each other along the X-axis. The functionally independent sensor corresponding to a mass element and lever section properly within plane X-Z (not shown) has a response axis normal to the plane X-Z whereas the functionally independent sensor which is twisted or bowed with respect thereto has a corresponding mass element $M_2''$ with a response axis at some angle $\phi_{E2}$ from normal to plane X-Z. An acceleration $\vec{A}_k$ in the Z direction will not displace the mass element properly within plane X-Z but will displace mass element $M_2''$ along its response axis in proportion to the Sine of $\phi_{E2}$. As a result, the rotational accelerometer is not exclusively sensitive to Y-direction acceleration differential components and will no longer entirely reject acceleration influences applied thereto from the Z direction. An error signal proportional to the Sine of the offset angle $\phi_{E2}$ and Z direction acceleration $\vec{A}_k$ will therefore be present.

Of course, FIGS. 5a through 5c illustrate fundamental geometric deviations independent of each other. Combinations of these fundamental deviations will produce error signals which are complex combinations of the individual error signals.

Figure 6A:
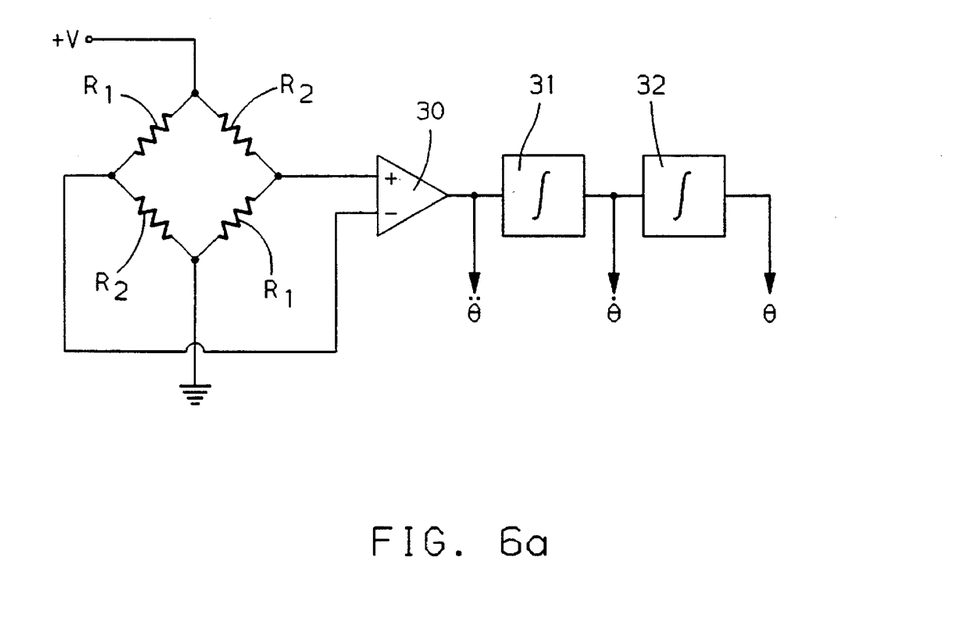
FIGS. 6a through 6c show alternate schematic and block diagrams of detection and conditioning circuitry according to the present invention.
Figure 6B:
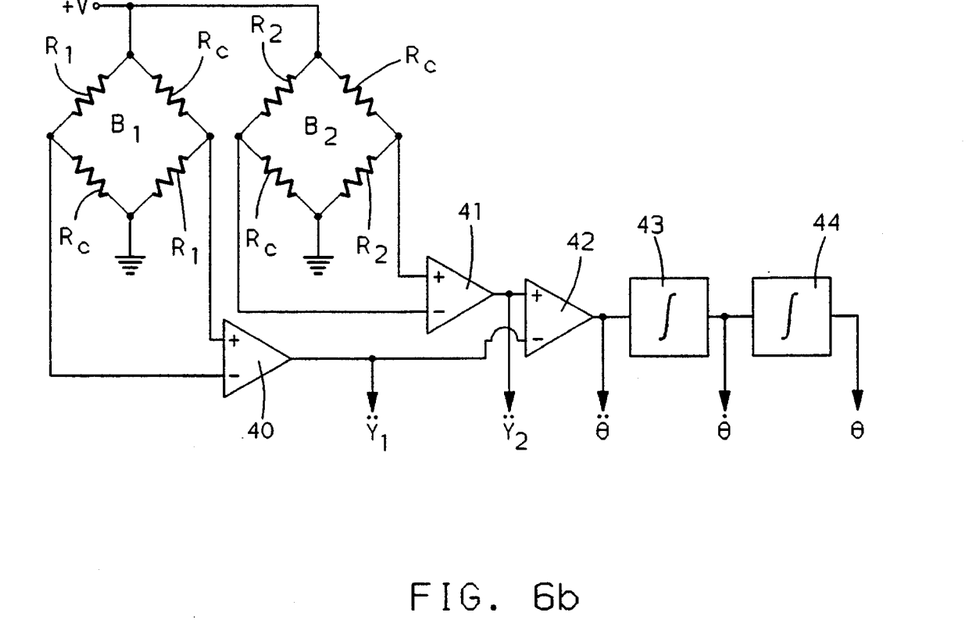
Figure 6C:
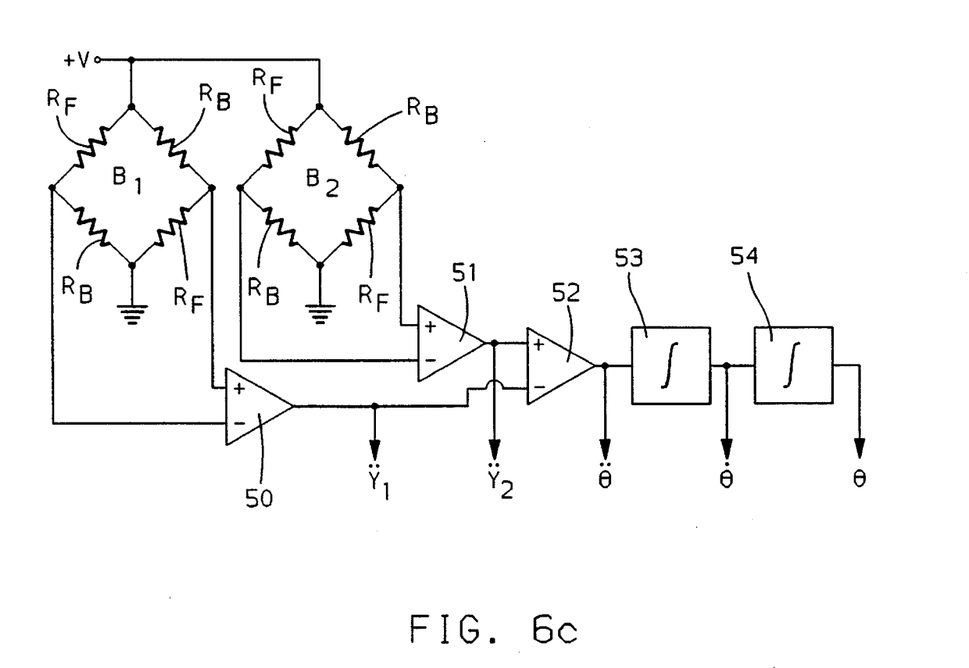

FIGS. 6a–6c show alternative embodiments of detection and conditioning circuitry wherein piezoresistors disposed on the surface of the U-shaped lever sections at the fulcrum ends provide means for detecting respective out of plane displacements of each mass element disposed at the unsupported end of each U-shaped lever section. Beginning first specifically with FIG. 6a, one embodiment is shown wherein piezoresistors are disposed upon one surface only of the U-shaped lever sections. Piezoresistors corresponding to one of U-shaped lever sections are designated $R_1$ and piezoresistors corresponding to the other of U-shaped lever sections are designated $R_2$. Piezoresistors are arranged in a conventional balanced Wheatstone bridge arrangement. The difference between the center node voltages for each leg of the Wheatstone bridge is amplified by differential amplifier 30, the output of which is proportional to rotational acceleration [l$]$¨gv̈. An integration of this signal by integrator 31 provides a signal proportion to rotational rate θ. The integral of the rotational rate signal by integrator 32 provides directional information θ. Amplification and integration functions can be performed by conventional operational amplifier analog circuitry. Alternatively, digital techniques for integration can be utilized and is well known. An arrangement as shown in FIG. 6a wherein piezoresistors are disposed on a single surface includes simplified manufacturing since the entire circuit including the piezoresistors and associated read out circuitry can be printed on top of the alumina substrate. Thus, not only is the number of electronic components in the device minimized, but the number of printing operations is reduced. Further, the Wheatstone bridge arrangement shown in FIG. 6a provides voltage inputs to differential amplifier 30 which are influenced by resistive changes in each component of each respective leg of the Wheatstone bridge resulting in larger signals than those obtainable in a bridge circuit having one constant value resistive component in each leg.

Referring now to FIG. 6b, another embodiment using single sided printing operations and benefitting from all of the single sided manufacturing advantages mentioned earlier is shown. Here however, two Wheatstone bridge circuits are shown, each corresponding to one of the functionally independent linear accelerometers. Bridge designated $B_1$ corresponds to one of U-shaped lever sections and bridge designated $B_2$ corresponds to the other of U-shaped lever sections. Piezoresistors corresponding to bridge $B_1$ are designated $R_1$ and piezoresistors corresponding to bridge $B_2$ are designated $R_2$. Resistive elements of the bridge circuits shown as $R_c$ correspond to nonvariable resistors and are constant in the circuit. Here, a first differential signal obtained from each respective bridge circuit is amplified by differential amplifiers 40 and 41, which provide individual measures of linear accelerations $\ddot{Y}_1$ and $\ddot{Y}_2$ corresponding to the respective linear accelerometers. Each of these output signals is independent from the other and the difference therebetween as amplified by differential amplifier 42 provides an output proportional to rotational acceleration [l$]$¨gv̈. Similar to previously described FIG. 6a, this signal of angular acceleration is integrated a first time at 43 to provide a signal which is a measure of rotational rate θ, and which rotational rate signal is then integrated at 44 to provide directional information θ. Individual differential signals obtained off of each individual bridge circuit will not be as strong as those obtained off of the bridge circuit in FIG. 6a wherein piezoresistors from both linear accelerometers combine in a single bridge circuit to provide the outputs. However, additional outputs in this arrangement are obtained which are indicative of linear accelerations ($\ddot{Y}_1$ and $\ddot{Y}_2$) of each of the individual accelerometers and which can be utilized to provide other information as will be described at a later point.

Referring now to FIG. 6c, an alternative embodiment using double sided printing operations and benefiting from the functional advantages of the embodiments shown in FIGS. 6a and 6b is shown. Here, two sided printing operations are utilized to dispose piezoresistors on both sides of each individual linear accelerometer. Similar to FIG. 6b, two Wheatstone bridge circuits are shown, each corresponding to one of the functionally independent linear accelerometers. Bridge designated $B_1$ corresponds to one of U-shaped lever sections and bridge designated $B_2$ corresponds to the other of U-shaped lever sections. All resistors shown in each bridge circuit are piezoresistive, the subscript designations F and B correspond respectively to front and back piezoresistor designations for corresponding U-shaped lever section. In this arrangement, each individual bridge circuit has piezoresistors comprising each leg of each bridge circuit which, such as the arrangement shown in FIG. 6a will provide a strong output. Additionally, such as the circuit shown in FIG. 6b, linear acceleration outputs ($\ddot{Y}_1$ and $\ddot{Y}_2$) corresponding to each linear accelerometer are also obtainable in this dual bridge arrangement. Processing of the various outputs by differential amplifiers 50, 51 and 52 is functionally identical to that shown in FIG. 6b and outputs therefrom and integration thereof at 53 and 54 is performed in a like manner to provide rotational acceleration [l$]$¨gv̈, rotational rate θ and directional information θ.

Therefore, while our invention has been described in terms of a preferred embodiment, it is apparent that other forms of the device could be adopted by one skilled in the art. By example, it is clear that these teachings could be used with modified or alternative materials, or with modified processing parameters, or with a modified structural design. Additionally, capacitive, inductive or other strain pickoff means could be utilized to detect deflection of the lever portions of the sensor. Accordingly, the scope of our invention is to be limited only by the following claims.

The embodiments of the invention in which an exclusive property or privilege is claimed are defined as follows:

1. A thick film rotational accelerometer comprising:

an alumina base portion defining a plane;

first and second support members integrally formed with and disposed at opposite ends of said alumina base portion;

first and second U-shaped lever sections integrally formed with said alumina base portion, each of said U-shaped lever sections essentially surrounding a corresponding one of said support members so that a gap is provided substantially everywhere between each of said U-shaped lever sections and the corresponding one of said support members except at said base portion;

first and second substantially equivalent masses, each of said masses disposed on an unsupported end of a respective one of said U-shaped lever sections so as to be oppositely disposed about said alumina base portion, such that the corresponding one of said support members is disposed between said alumina base portion and a corresponding one of said masses; and means for independently detecting respective displacements of each of said masses in a direction normal to the plane of said alumina base portion to determine a measure of rotational acceleration.

* * * * *